United States Patent
Butz

(10) Patent No.: US 8,585,297 B2
(45) Date of Patent: Nov. 19, 2013

(54) APPARATUS WITH ROLLING BEARING HAVING A SLEEVE

(75) Inventor: Felix Butz, Köln (DE)

(73) Assignee: Siemens Aktiengesellschaft, München (DE)

( * ) Notice: Subject to any disclaimer, the term of this patent is extended or adjusted under 35 U.S.C. 154(b) by 85 days.

(21) Appl. No.: 13/221,172

(22) Filed: Aug. 30, 2011

(65) Prior Publication Data

US 2012/0219248 A1    Aug. 30, 2012

(30) Foreign Application Priority Data

Aug. 31, 2010   (EP) ................................. 10174675

(51) Int. Cl.
*F16C 19/04*   (2006.01)
*F16C 23/04*   (2006.01)
*F16C 27/04*   (2006.01)

(52) U.S. Cl.
USPC ............ 384/490; 384/495; 384/535; 384/581

(58) Field of Classification Search
USPC .......... 384/490, 495, 535, 536, 558, 581, 582
See application file for complete search history.

(56) References Cited

U.S. PATENT DOCUMENTS

| | | | | |
|---|---|---|---|---|
| 3,813,135 A | * | 5/1974 | Martinie | 384/491 |
| 4,820,243 A | * | 4/1989 | Fub | 474/43 |
| 4,934,840 A | * | 6/1990 | Paret | 384/497 |
| 5,320,430 A | | 6/1994 | Kobayashi | |
| 6,568,853 B2 | * | 5/2003 | Mochizuki | 384/58 |

FOREIGN PATENT DOCUMENTS

| | | |
|---|---|---|
| AT | 104 039 B | 8/1926 |
| DE | 24 07 479 A1 | 8/1974 |
| EP | 0 293 897 A1 | 12/1988 |
| EP | 1 225 352 A1 | 7/2002 |

* cited by examiner

*Primary Examiner* — Thomas R Hannon
*Assistant Examiner* — Kashif Mohammed
(74) *Attorney, Agent, or Firm* — Henry M. Feiereisen LLC

(57) ABSTRACT

A rolling-bearing mounted apparatus includes a shaft, and at least one rolling bearing supporting the shaft in a section of the apparatus. The rolling bearing includes at least one inner ring arranged on the shaft, an outer ring arranged on the section, and rolling elements arranged between the inner and outer rings. A sleeve is provided between the outer ring and the section to permit an axial and/or radial displacement of the outer ring of the rolling bearing when exposed to an axially and/or radially directed force. The sleeve has at least two rows of recesses, with hollow-drilled rolling elements being arranged in the recesses of the sleeve.

4 Claims, 4 Drawing Sheets

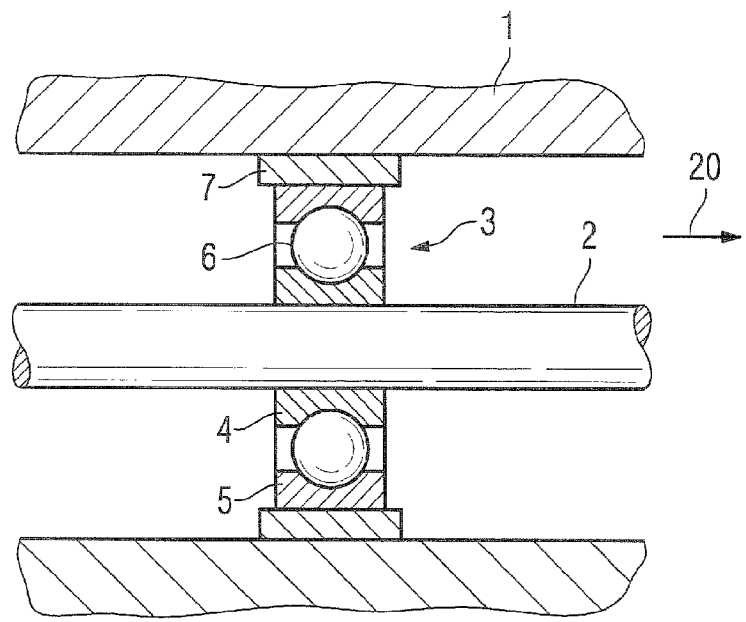
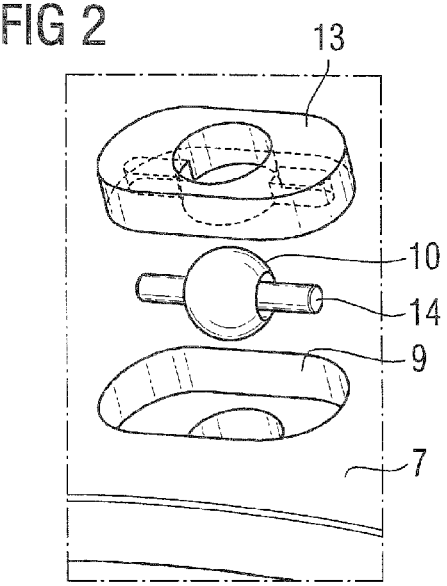
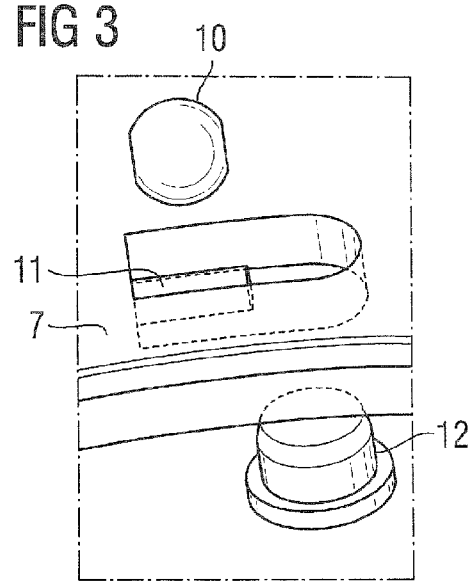

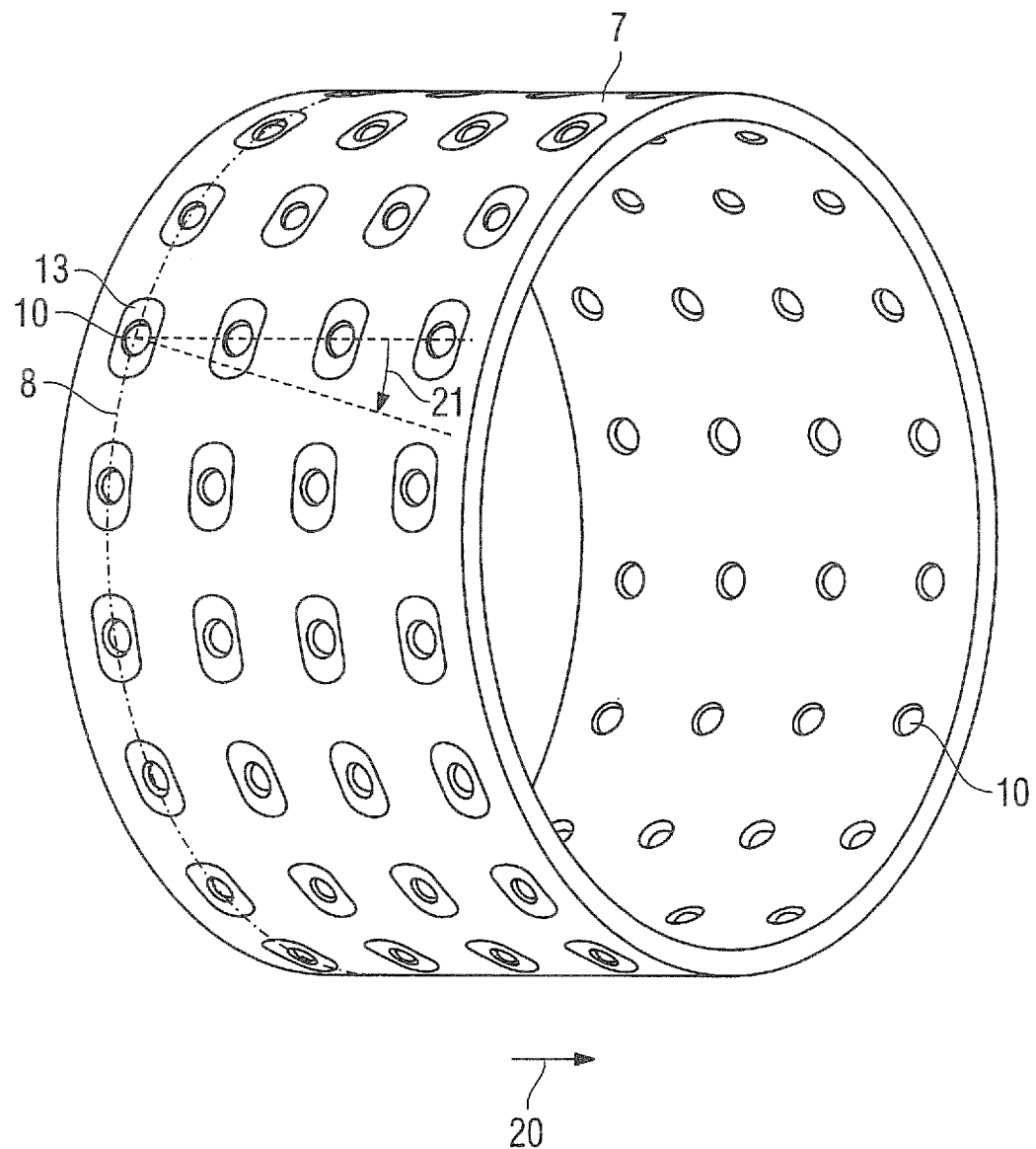

APPARATUS WITH ROLLING BEARING HAVING A SLEEVE

CROSS-REFERENCES TO RELATED APPLICATIONS

This application claims the priority of European Patent Application, Serial No. EP 10174675, filed Aug. 31, 2010, pursuant to 35 U.S.C. 119(a)-(d), the content of which is incorporated herein by reference in its entirety as if fully set forth herein.

BACKGROUND OF THE INVENTION

The present invention relates to a rolling-bearing mounted apparatus having a shaft which is supported on a section of the apparatus by at least one rolling bearing.

The following discussion of related art is provided to assist the reader in understanding the advantages of the invention, and is not to be construed as an admission that this related art is prior art to this invention.

Rolling-bearing mounted units and/or assemblies allow axial movement of high-precision apparatuses and must have guidance which is free from play or is pre-tensioned. This guidance is achieved by means of high-precision surfaces and rolling elements which are matched to one another in the micrometer range.

Apparatuses which have internal thermal loss sources that vary over time significantly influence the pre-tensioning situation and thus the guidance of the unit and/or the assembly. The heat input into the unit and the adjacent units is for the most part non-uniform. Different operating temperatures therefore occur as a result of their different heat-absorbing or heat-emitting properties. The thermal expansion of the individual elements of the different assemblies thus differs as a result of the different operating temperatures. As a result, the rolling element contacts can either be subject to play or pre-tensioned so greatly that the play-free guidance function is no longer guaranteed or the machine element malfunctions as a result of overloading of the rolling contact.

It would therefore be desirable and advantageous to provide an improved rolling-bearing mounted apparatus which obviates prior art shortcomings and in which thermal stress does not adversely affect operation of the rolling bearing.

SUMMARY OF THE INVENTION

According to one aspect of the present invention, a rolling-bearing mounted apparatus includes a shaft, at least one rolling bearing supporting the shaft in a section of the apparatus, with the rolling bearing including at least one inner ring arranged on the shaft, an outer ring arranged on the section, and rolling elements arranged between the inner and outer rings, a sleeve provided between the outer ring and the section to permit an axial and/or radial displacement of the outer ring of the rolling bearing when exposed to an axially and/or radially directed force, with the sleeve having at least two rows of recesses, and hollow-drilled rolling elements arranged in the recesses of the sleeve.

The arrangement of a sleeve between the outer ring of the rolling bearing and the section of the apparatus enables movements of the outer ring in the axial direction, which occur as a result of stress caused by thermal expansion of the shaft within the rolling bearing. For instance, the inner ring is moved in an axial and/or radial direction as a result of the thermal expansion of the shaft. Stress results due to this fact, which the rolling element attempts to transfer onto the outer ring. The aforecited disadvantages are prevented in accordance with the invention by enabling the outer ring to follow the movement axially and/or radially as a result of the presence of the sleeve, without compromising the functionality of the rolling bearing. Play-free guidance is thus ensured at all times.

Two or more rows of hollow-drilled rolling elements can be advantageously provided in the sleeve, so that the bearing surfaces of the rolling elements are evenly distributed over the section.

According to another advantageous feature of the present invention, the recesses can be arranged in offset relationship to the shaft, when viewed in an axial direction. This further distributes the bearing points in this section.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a sectional view of a basic configuration of a rolling-bearing mounted apparatus according to the present invention;

FIG. 2 is an exploded perspective illustration of one variation of a sleeve of the apparatus of FIG. 1, depicting the sleeve with plates;

FIG. 3 is an exploded perspective illustration of another variation of a sleeve of the apparatus of FIG. 1, depicting the sleeve with integrated guide pin;

FIG. 4 is a perspective view of the sleeve of FIG. 2;

DETAILED DESCRIPTION OF PREFERRED EMBODIMENTS

Figure 5:
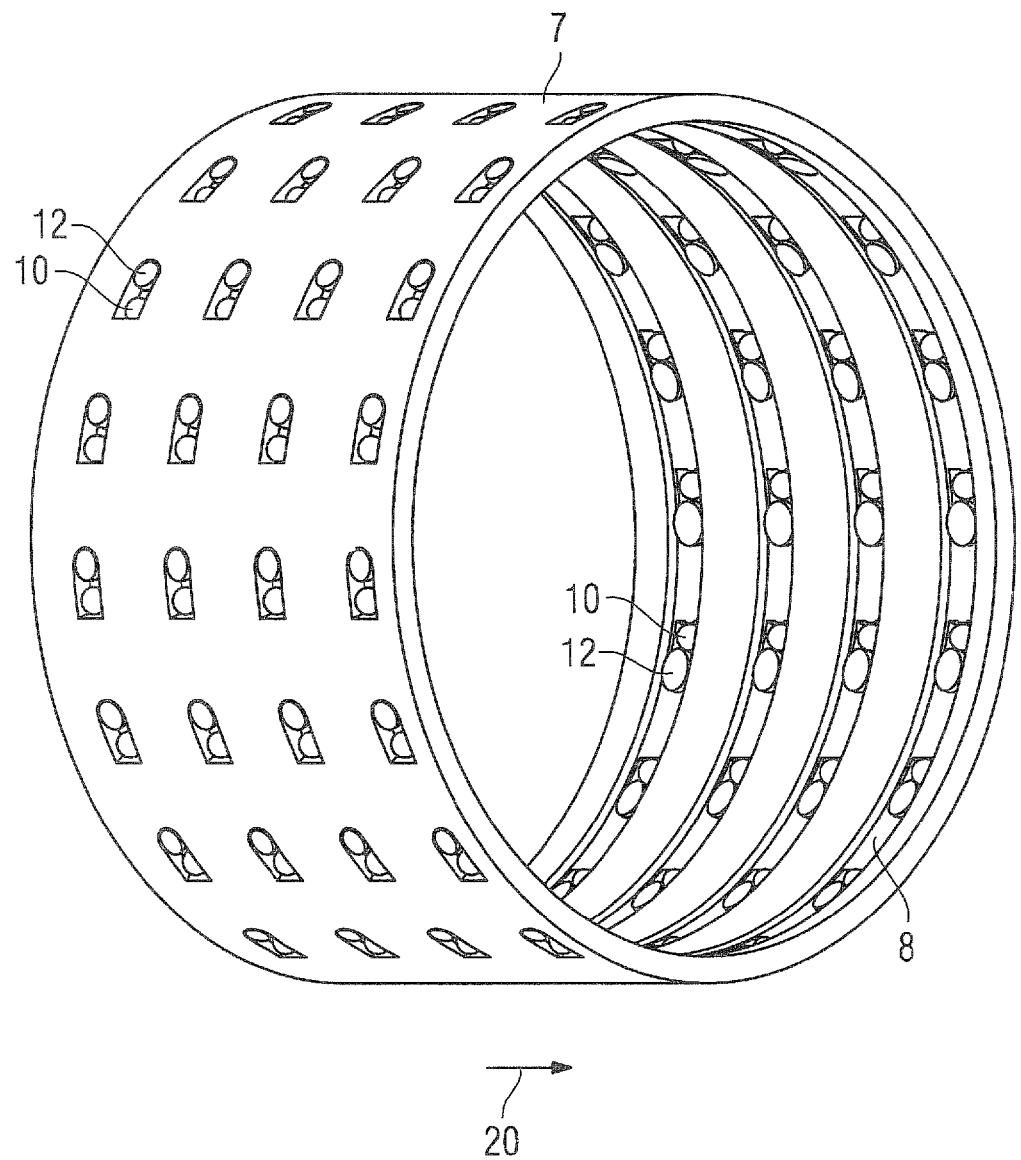
FIG. 5 is a perspective view of the sleeve of FIG. 3.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of a basic configuration of a rolling-bearing mounted apparatus 1 according to the present invention, with a shaft 2 being supported in a section of the apparatus 1 by a rolling bearing 3. The rolling bearing 3 includes an inner ring 4 which is arranged on the shaft 2 and is supported by an outer ring 5 via a rolling element 6. A sleeve 7 is provided between the outer ring 5 and the rolling-bearing mounted apparatus 1 to absorb axial and/or radial expansions of the shaft 2 and thereby prevent tension between the inner and outer rings 4, 5 of the rolling bearing 3 that may cause damage to the rolling element 6 and/or bearing surface of the rolling bearing 3 in the inner ring 4 or outer ring 5.

Figure 6:
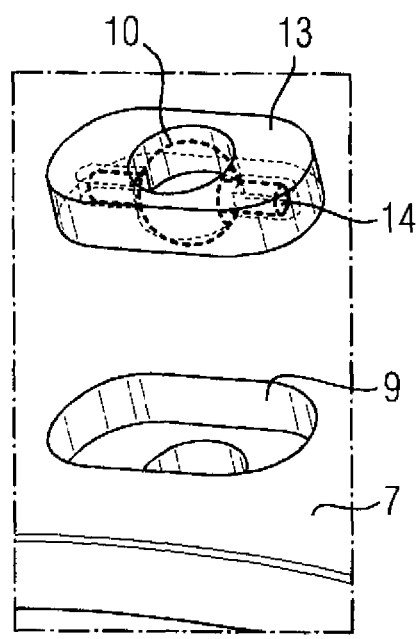
FIG. 6 is a partly exploded perspective illustration of the sleeve of FIG. 2 with received guide pin.

FIG. 2 shows a detailed representation of one variation of the sleeve 7 with a recess 9, in which a plate 13 can be inserted with corresponding pre-stamped areas, with the pre-stamped areas receiving a separate guide pin 14, indicated in FIG. 6 by way of a broken line, and a hollow-drilled rolling element 10 assigned thereto, in particular a hollow-drilled ball. The plate 13 is insertable into the recess 9, preferably detachably snapped into place.

Using a plurality of plates 13 of this type for insertion into the recesses 9 of the sleeve 7, respectively, produces a sleeve 7 as shown in FIG. 4. The sleeve 7 rests with its inner surface against the outer ring 5 of the rolling bearing 3 so as to allow the outer ring 5 of the rolling bearing 3 to move in an axial direction, as indicated by arrow 20 within the rolling-bearing mounted apparatus 1 by way of the individual hollow-drilled rolling elements 6.

FIG. 3 shows an exploded perspective illustration of another variation of a sleeve 7 which has integrated therein guide pins 11, on which the hollow-drilled rolling elements 10 are arranged, respectively. Additional guide elements 12 position and fix the hollow-drilled rolling elements 10 in place on the guide pins 11. Overall, this produces a sleeve 7 according to FIG. 5, which can also be inserted between the outer ring 5 of the rolling bearing 3 and the rolling-bearing mounted apparatus 1.

The diameter of the hollow-drilled rolling elements 10 in the radial direction is basically marginally larger than the thickness of the sleeve 7. Only in this way can an axial and play-free movement of the sleeve 7 be achieved.

More than one hollow-drilled rolling element 10 may, of course, be provided on the guide pin 11 of the exemplary embodiments according to FIGS. 2, 3.

As further shown in FIGS. 4, 5, the sleeves 7 includes hollow-drilled rolling elements 10 arranged axially one behind the other. Similarly when viewed in the circumferential direction, as basically shown in FIG. 4, a number of hollow-drilled rolling elements 10 are distributed over the circumference, preferably with an equidistant spacing.

The hollow-drilled rolling elements 10 can also be arranged offset when viewed in an axial direction onto the sleeve 7, with the recesses 9 of the sleeve 7 being provided accordingly. This can be realized during manufacture of the sleeve 7 by an angular offset 21 or in a helical arrangement of the recesses 9 on the sleeve 7.

Although not shown in detail, it is, of course, also conceivable to arrange a sleeve 7 between the shaft 2 and the inner ring 4 of a rolling bearing 3.

As a result, three positioning options can basically be established, namely between the outer ring 5 of the rolling bearing 3 and apparatus 1, or between the inner ring 4 of the rolling bearing 3 and shaft 2, or both between the outer ring 5 of the rolling bearing 3 and apparatus 1 also between the inner ring 4 of the rolling bearing 3 and shaft 2.

In accordance with the invention and irrespective of the afore-described embodiment, the sleeve 7 allows for a play-free guidance of the rolling bearing 3 in the event of a radial and/or axial thermal expansion of the shaft 2. The radial expansion is hereby absorbed by the hollow-drilled rolling elements 10, which are therefore arranged with play on their guide pins 11, 14. The hollow-drilled rolling elements 10 can therefore be pressed together more easily and contribute to a play-free guidance.

An axial expansion is absorbed by movement of the sleeve 7 between the outer ring 5 and the apparatus 1 for instance, as the outer ring 5 is able to move therewith. The sleeve 7 is therefore constantly in rolling contact so that play-free guidance is ensured.

The play-free guidance is needed in the case of high-precision machine tools, such as spindle drives for example.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A rolling-bearing mounted apparatus, comprising:
   a shaft;
   at least one rolling bearing supporting the shaft in a section of the apparatus, said rolling bearing comprising at least one inner ring arranged on the shaft, an outer ring arranged on the section, and rolling elements arranged between the inner and outer rings;
   a sleeve provided between the outer ring and the section to permit an axial and/or radial displacement of the outer ring of the rolling bearing when exposed to an axially and/or radially directed force, said sleeve having at least two rows of recesses;
   hollow-drilled rolling elements arranged in the recesses of the sleeve; and
   plates received in the recesses in one-to-one correspondence and having a shape complementing a shape of the recesses, each said plate receiving a guide pin for support of a respective one of the hollow-drilled rolling elements.

2. The apparatus of claim 1, wherein the recesses are arranged in offset relationship to the shaft, when viewed in an axial direction.

3. The apparatus of claim 1, further comprising guide elements received in the recesses and positioning the hollow-drilled rolling elements in the recesses together with the guide pins.

4. The apparatus of claim 1, wherein the plates are constructed to snap into the recesses.

* * * * *